April 28, 1970 J. REEF 3,508,337
GEAR COMPARATOR

Filed March 22, 1968 3 Sheets-Sheet 1

INVENTOR
JAN REEF
BY
Burton & Parker
ATTORNEYS

April 28, 1970
J. REEF
3,508,337
GEAR COMPARATOR
Filed March 22, 1968
3 Sheets-Sheet 2
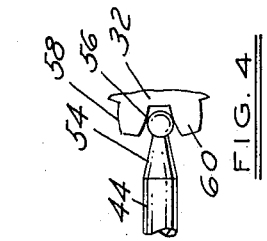
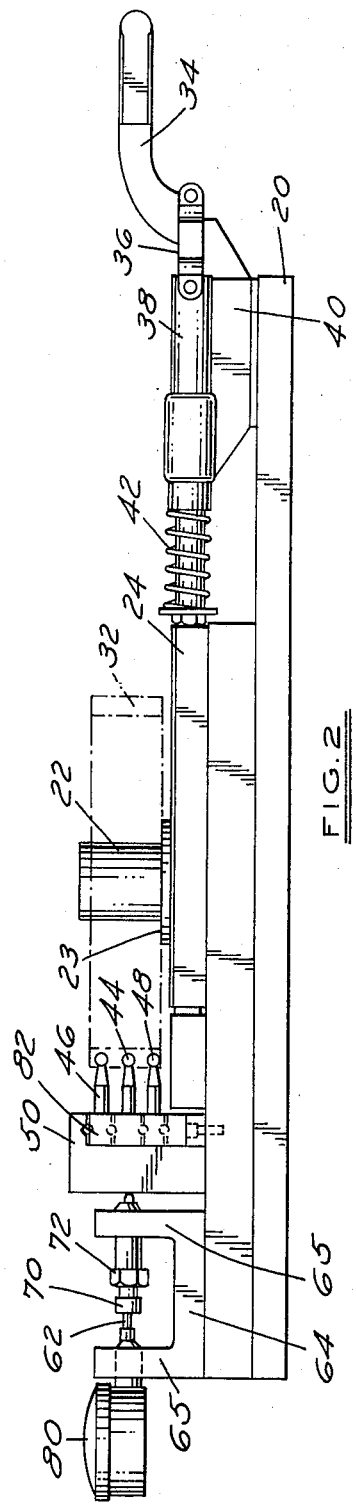
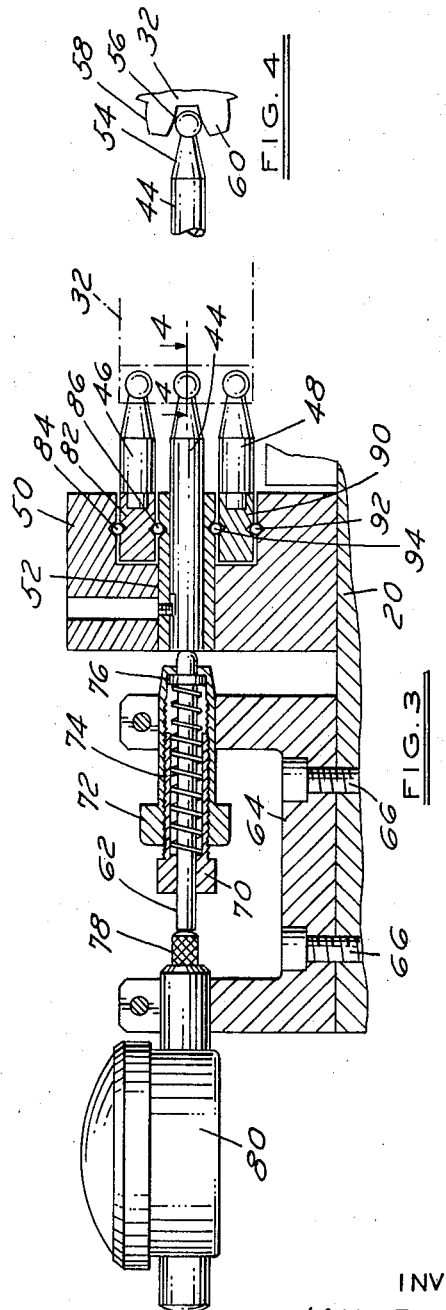
INVENTOR
JAN REEF
BY
Burton & Parker
ATTORNEYS April 28, 1970     J. REEF     3,508,337

GEAR COMPARATOR

Filed March 22, 1968     3 Sheets-Sheet 3

INVENTOR
JAN REEF
BY
    Burton & Parker
ATTORNEYS

United States Patent Office 3,508,337
Patented Apr. 28, 1970

3,508,337
GEAR COMPARATOR
Jan Reef, 41520 8 Mile Road, Northville, Mich. 48167
Filed Mar. 22, 1968, Ser. No. 715,292
Int. Cl. G01b 5/20
U.S. Cl. 33—179.5           5 Claims

ABSTRACT OF THE DISCLOSURE

This disclosure is a gear comparator. It is designed to be usable by a gear-making workman in comparing certain characteristics such as lead and pitch radius with the same characteristics of a master gear which the gear being made is to duplicate. It comprises a gear-supporting trunnion mounted for shiftable movement from a neutral position to a working position. At the working position a gear mounted on the trunnion may be readily checked as to each desired characteristic with readings shown on indicator gauges preset from a master gear. Adjacent to the working position of the trunnion, upon which the gear to be checked is mounted, the comparator is provided with a positioning pin and two contact pins. Each pin is supported to be moved into seating engagement with determined surfaces of the gear on the trunnion. Each pin is responsive to its gear seating engagement to show on its indicator gauge the response of the pin to such engagement.

BACKGROUND OF THE INVENTION

In the manufacture of gears it is desirable that the utmost accuracy be achieved at minimum cost. To accomplish such it is desirable that any error developed in the making of the gear be detected quickly and accurately. This gear comparator is design for simplicity of construction, use and reading, and in order that it may be used by the gear making workman and does not require the service of a skilled inspector. It is designed for rapidity of functioning and reading in order that the work being checked may be quickly and accurately checked against preset readings shown on the indicator gauges from comparison with a master gear.

This gear comparator is designed to be disposed adjacent to the place where the workman is making gears in order that his work and progress may be checked by him quickly and at his place of work. It is of a sturdy simple character and is designed to give information instantly and in a form readily understandable by the workman. It eliminates loss of time and accomplishes saving of material by substantially minimizing waste and speeds up the operation of the gear maker. The closest prior art known to this applicant is his own prior Patent No. 3,167,867 dated Feb. 2, 1965. The construction shown in this patent is not of the character to furnish the information that this comparator furnishes. It would require supplementation by other additional data and inspection by inspectors to provide the information provided instantly and at one and the same time by this comparator.

FIGURE 2 is a side elevation of the mechanism shown in FIGURE 1;

FIGURE 3 is a cross sectional view taken on line 3—3 of FIGURE 1;

FIGURE 4 is a cross sectional fragmentary view taken on line 4—4 of FIGURE 3;

Figure 1:
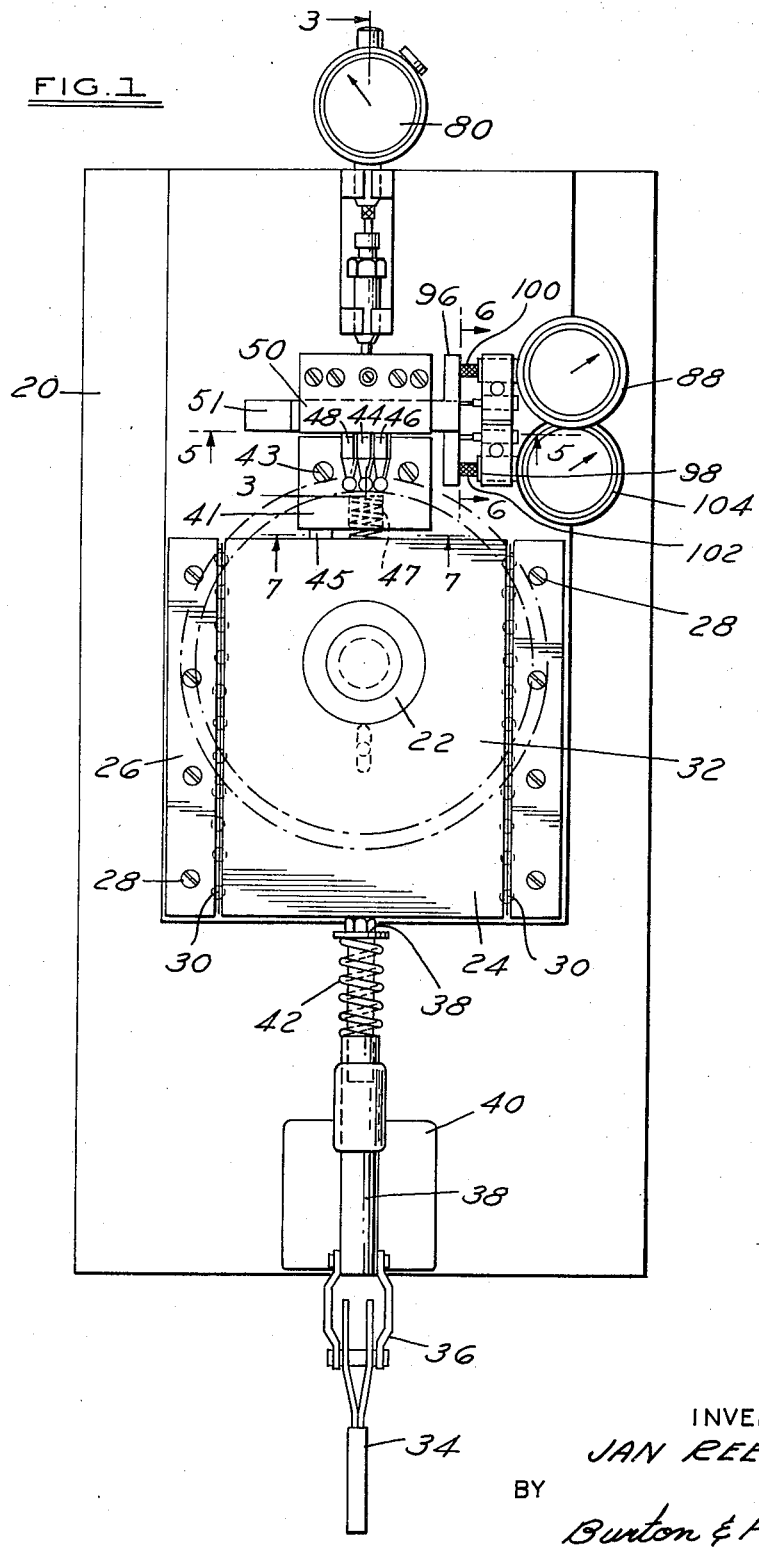
FIGURE 1 is a plan view of the comparator of this invention showing the operation at the time of checking a gear to determine its comparison with the master gear.

The comparator shown in the drawings comprises a base indicated as 20 in FIGS. 1 and 2. Mounted upon the base is a trunnion indicated as 22 in FIGS. 1 and 2. This trunnion is slidably supported upon a table 24 mounted between guide rails 26 secured to the base 20 by screws 28. Ball bearing assemblies 30 are disposed between the guide rails 26 and the sides of the table to facilitate slidable movement of the table over the base from a neutral position to a position at which the gear mounted on the trunnion is in a position to be acted upon and checked by the evaluation mechanism of the comparator. A gear 32 is shown in dotted outline as mounted upon that portion of the trunnion which extends above the table. It is understood that there is a similar trunnion portion below the flange 23 of the trunnion which is seated within a recess in the table so as to support the trunnion to travel with the table.

The table 24 and the trunnion coupled therewith for movement with the table is adapted to be actuated by manual toggle mechanism shown in FIGS. 1 and 2. This toggle mechanism is provided with a handle 34 which is coupled by linkage 36 with a plunger 38. This plunger extends through a frame portion 40 of the toggle which is mounted upon the base 20 of the comparator. This plunger is held projected by a spring 42 and the end of the plunger is disconnectedly engaged with the table 24 so as to move the table and the trunnion toward the working position of the trunnion as shown in FIGS. 1 and 2 when the handle is in the position shown in such figures. It is apparent that when the handle is elevated from the position shown in FIGURES 1 and 2 that the plunger 38 and spring 42 will be withdrawn away from the table and through means hereinafter described the table will be moved to withdraw the trunnion from its working position to its inoperative or neutral position.

Figure 7:
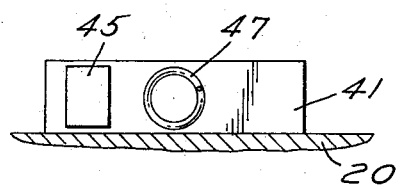
FIGURE 7 is a cross sectional view taken on line 7—7 of FIGURE 1.
Figure 8:
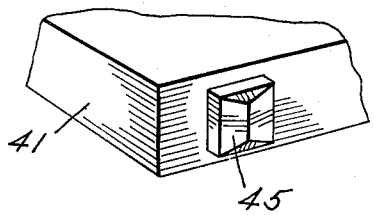
FIGURE 8 is a view of the stop element per se that arrests the movement of the shiftable gear supporting trunnion carriage at its working position.

There is a positive stop shown in FIGURES 1 and 2 and indicated at 41 which is a block fastened by screws or the like at 43 to the base. The stop portion per se is indicated as 45 and is particularly shown in FIGURES 7 and 8. It will be noted that this stop element has a vertical line contact portion which is adapted to engage the table and form a fixed stop for its movement from its neutral to its working position when actuated by the handle. It will be seen that there is a spring 47 carried by the stop block which projects toward the table to extend beyond the stop per se point 45 of the stop assembly so that the spring will first engage the table as the table is being actuated by the toggle mechanism to its point of positive contact with the stop element 45. This spring therefore cushions the movement of the table, trunnion, and gear toward the working position.

When the inspection of the gear on the trunnion has been completed as hereinafter described the toggle is actuated by lifting the handle which withdraws the plunger 38 and the spring 42 away from the table so that the table and toggle may be pushed back by the spring 47 to its neutral or its inoperative position.

Adjacent to the working position of the trunnion, that is when it has been advanced forward from the neutral to the working position, there is provided a series of pins adapted to be engaged by a gear mounted on the trunnion as shown in FIGURES 1, 2, 3 and 4. There is a positioning pin indicated as 44 and in the view of FIGURE 3 there is a contact pin 46 superimposing the positioning pin and a contact pin 48 shown as below the positioning pin. The pins are shown in FIGURE 1 as somewhat exaggeratedly offset to better illustrate the same but they actually overlap in superimposition as they are all three received within the same gap between two adjacent teeth of the gear 32 as hereinafter described and shown in FIGURE 3. Each of these pins is disposed to engage determined surfaces of the gear 32 being checked as hereinafter set forth.

There is a supporting standard indicated as 50 mounted upon the base. This standard has a block 52 mounted thereon and through which the positioning pin 44 slidably extends as shown most clearly in FIGURE 3. The forward end of the positioning pin 44 is shown in FIGURE 4 as being tapered as at 54 but as terminating in a ball end 56. In applicant's prior patent hereinabove referred to the pins are tapered right to the extremity and are not provided with ball ends. Certain customers however prefer ball ends on this type of pin and such is the form in which they are shown in this application but it is apparent the tapered ends would be equally usable.

The positioning pin 44 with its ball end 56 is shown in FIGURE 4 as having its ball end seated within the gap between a pair of successive gear teeth indicated in FIGURE 4 as 58 and 60. The positioning pin is shown as held forwardly by means hereinafter described so that it will be received within the gap between the two adjacent gear teeth when the gear supporting trunnion is advanced to its working position as shown in FIGURES 2 and 3. When the ball end of the positioning pin is seated within the gap between the two teeth of the gear, the gear is positioned for proper reception of the contact pins 46 and 48.

More than that, the positioning pin 44 as it seats as shown in FIGURE 4 upon the opposed surfaces of the gear teeth is responsive to determine the pitch radius of the gear. It will be observed, in FIGURE 3, that this pin is disconnectedly engaged with a plunger 62 carried by a standard 64 which standard is mounted on the base by screws 66. This plunger is supported for slidable movement within a tubular guide 70 which guide is threaded as shown within a carrying sleeve 72, which sleeve is directly mounted in one of two upright ends 65 of the standard 64. A spring 74 encircles the plunger and is disposed within the guide tube 70 and seats at one end against the bottom of the guide tube and at the opposite end against a flange 76 on the plunger 62. The plunger 62 extends through the bottom of sleeve 72 and disconnectedly bears against the end of positioning pin 44 to be actuated thereby. The opposite end of the plunger disconnectedly bears against a plunger 78 which is connected with an indicator gauge 80 so as to actuate the needle of such gauge to respond to the movement of the positioning pin 44 to indicate the response thereof to being seated as shown in FIGURE 4 between the two teeth of the gear on the trunnion. Such response of the indicator gauge measures the pitch radius of the gear being checked. It indicates therefore the concentricity or it might be eccentricity of the gear being checked as compared with the master gear.

It is to be understood that all of the indicator gauges shown on the comparator and there are three of them, one for the positioning pin and one each for the two contact pins 46 and 48, have been preset at a determined figure such as zero for the gauges when the gauges are set to indicate determined characteristics of the master gear. In other words the setting of the indicator gauges was originally made with respect to the characteristics of the master gear which characteristics are to be measured on the gear being tested and the agreement with or the variance from these characteristics of the master gear by the gear being tested is therefore readily seen by the workman checking the gear. The positioning pin therefore is not only to position the gear on the trunnion and hold it at such position for the other checking by the contact pins, but its response to its seating engagement with the gear indicates the pitch radius or the eccentricity, if such is the case, as compared with the master gear.

Figure 5:
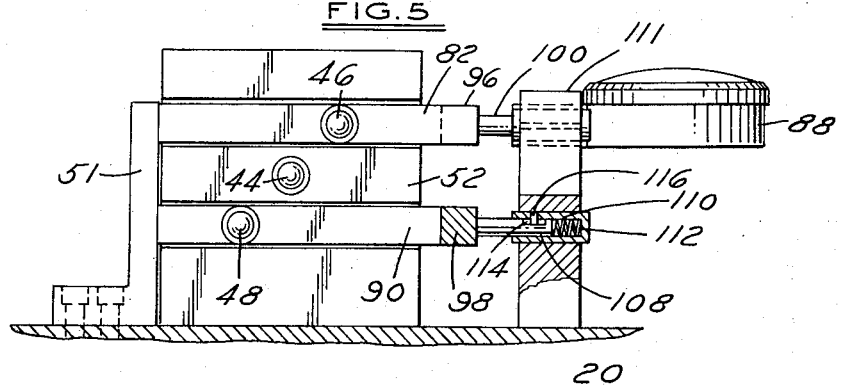
FIGURE 5 is an elevation partly in section taken on line 5—5 of FIGURE 1.

The contact pin 46 is carried by a slidable block 82 shown in FIGURES 2 and 5. This slidable block is mounted within a cut out formed between the upper portion of the standard 50 and the fixed block or guideway 52 within which the positioning pin 44 is mounted for slidable movement. There is a ball race 84 between the slidable block 82 and the upper face of the cut out in the standard 50 and a ball race 86 between the lower face of the slidable block 82 and the fixed block 52 or guideblock through which the positioning pin 44 travels. These ball races 84 and 86 facilitate the slidable movement of this block 82 in response to pressure of its ball end pin 46 against the face of a gear tooth against which the end of the pin seats. The contact pin 46 carried by this block 82 has its ball end received within the same gap as the positioning pin 44 but is disposed above the positioning pin. Its ball end seats against the same face of a tooth engaged by the positioning pin.

The contact pin 48 which is received within the same gap as the positioning pin between the teeth of the gear being checked, but below the positioning pin, seats against the same face of the same tooth as the contact pin 46. Unless the ball ends of the contact pins are relieved on one side they would both seat against opposed faces of the two teeth between which the positioning pin is seated. These contact pins indicate lead.

The second contact pin which is disposed below the positioning pin and indicated as 48 is carried by block 90 which is slidably supported within the standard 50. This lower slidable block 90 is provided with ball races 92 and 94 which serve the same purpose as the ball races 84 and 86 serve with the upper slidable block 82. The movement of each slidable block is an endwise movement and results from the bearing contact of the ball end of the contact pins carried by the blocks engaging the same face of the same gear tooth as is engaged by the positioning pin. The slidable blocks, both 82 and 90 each have an outer angular end face portion, 96 for slidable block 82 and 98 for the slidable block 90. It will be seen that these outer end face portions extend in opposite directions. These outer end face portions 96 and 98 are shown best in FIGURES 1 and 5. These end face portions 96 and 98 each are disconnectedly engaged with the plungers 100 and 102 of the indicator gauges 88 and 104 to actuate said plungers. These are standard indicator gauges each has a spring that holds the gauge needle normally at a determined point, for example zero, until this plunger is actuated.

The assembly which carries the sliding blocks includes the standard 50 that directly carries the blocks, and associated with it as shown in FIGURE 5 is an upright stop portion 51. The sliding blocks 82 and 90 are pushed back against this stop 51 as follows. In the structure of the applicant's prior patent its sliding blocks were pushed back by the indicator springs when the pressure was relieved from the indicator plungers. This imposed too much strain on the indicator springs in some instances. In this application there is associated with each of the sliding blocks an auxiliary spring which is shown best in FIGURE 5. In FIGURE 5 the outer face 98 of the sliding block 90 is shown as having a spring pressed plunger 108 which is supported within a cup shaped spring receiver 110 which is carried by a standard 111 mounted upon the base 20 along side the standard 50. The spring itself is indicated as 112. This spring bears against the end of the plunger 108 that is received within the cup carrier 110. The plunger 108 has a cut out slot 114 shown in FIGURE 5. A pin 116 extends through the cup wall and its end is received within the cut out as shown in FIGURE 5 so as to limit the movement of the plunger.

Figure 6:
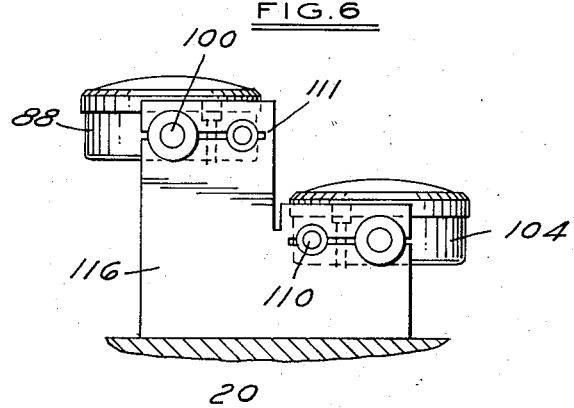
FIGURE 6 is a cross sectional view taken on line 6—6 of FIGURE 1.

When the pressure is relieved from the contact pin 48 which is carried by the sliding block 90, this causes the block to move the plunger of the indicator gauge. When the pressure is relieved from the contact pin 46 upon the gear surface the spring 112 acts upon the block to return the block so that its opposite end engages the stop 51 as shown in FIGURE 5 and the block is thereby at its neutral position against this stop 51. In FIGURE 6 we are looking toward the standard 111 that is secured to the base 20 and the plungers of the two indicator gauges are received and extend through the standard as shown in FIGURES 5 and 6. The auxiliary spring cups and springs are also disposed within this standard 111 as shown in FIGURE 5. In FIGURE 5 the extension of the indicator gauge plunger 100 is shown as extending through the standard and the indicator gauge 88 is shown as supported thereupon as illustrated particularly in FIGURES 1 and 6. It is understood that there is an auxiliary spring assembly for each of the slidable blocks 82 and 90. It is of course understood that when the table and its trunnion are returned to their neutral position with the gear being checked being withdrawn from the pins 44, 46 and 48 the sliding blocks are returned to their neutral position and so do the gauge needles.

What is claimed is:

1. A gear comparator having a base, a gear supporting trunnion mounted on the base for reciprocation thereover to move the trunnion from and to a neutral position and from and to a working position, a gear positioning pin so supported relative to the trunnion when such is at its working position that the contact end of the positioning pin is shiftable into and out of the gap between two teeth of a gear mounted on the trunnion, said contact end of the positioning pin when received within said gap and seated upon the opposed faces of said two adjacent teeth adapted to position said gear on the trunnion, said positioning pin having an idicator gauge coupled therewith to indicate the pitch radius of the gear mounted on the trunnion and at the point of seating of the positioning pin on said opposed faces as compared with a determined master gear according to which said indicator gauge dial has been preset, said positioning pin being shiftable in its support between the engagement of its contact end with the gear and its engagement with its indicator gauge, two contact pins so supported relative to the positioning pin that all three pins have their contact ends so relatively disposed as to be received at the same time within the gap between said two adjacent teeth of the gear mounted on the trunnion, each of said two contact pin ends engaging one and the same face of said two adjacent teeth of the gear, an indicator gauge provided for each contact pin, shiftably supported mechanism interposed between each contact pin and its indicator gauge to transmit motion from the contact pin to the dial indicator of the gauge to register a determined seating engagement of the contact pin on the face of the tooth of the gear contacted thereby on the dial indicator of the gauge relative to a preset reading made by the same contact pin on the master gear.

2. A gear comparator as defined in claim 1, characterized in that the contact end of one contact pin is engaged with the face of the tooth adjacent to the gap above the point of seating engagement therewith of the positioning pin, and the other contact pin has its contact end engaged with the same face of the same tooth below the point of steering engagement therewith of the positioning pin, each contact pin so coupled with its gauge as to indicate on the dial face thereof correspondence with or variation therefrom of its reading as compared with the preset reading of a master gear therewith.

3. A gear comparator as defined in claim 1, characterized in that each of the two contact pins is provided with spring means operably coupled with the shiftably supporting mechanism interposed between each contact pin and its indicator gauge to return the contact pin to a neutral position.

4. A gear comparator as defined in claim 3, characterized in that said shiftably supported mechanism interposed between each contact pin and its indicator gauge disconnectably couples the contact pin with its indicator gauge and the spring means acting thereupon is disconnectably coupled therewith.

5. A gear comparator as defined in claim 3, characterized in that the positioning pin is coupled with its indicator gauge through an endwise, slidably supported plunger, spring means holding said plunger at one end against the opposite and inner end of the positioning pin, said plunger having its opposite end bearing against the outer end of the indicator plunger thereby maintaining motion transmitting response of the positioning pin contact end between the gear and the dial indicator of the positioning pin.

References Cited

UNITED STATES PATENTS

| | | | |
|---|---|---|---|
| 3,269,021 | 8/1966 | Bonem | 33—179.5 |
| 3,167,867 | 2/1965 | Reef | 33—179.5 |
| 2,367,004 | 1/1945 | Chitwood | 33—179.5 |
| 1,840,538 | 1/1932 | Simmons | 33—179.5 |

SAMUEL S. MATTHEWS, Primary Examiner